United States Patent [19]

Fujiwara et al.

[11] Patent Number: 5,734,782
[45] Date of Patent: Mar. 31, 1998

[54] PROGRESSIVE SCAN SIGNAL RECORDING APPARATUS

[75] Inventors: Yuji Fujiwara, Nishinomiya; Masakazu Nishino, Kashiwara, both of Japan

[73] Assignee: Matsushita Electric Industrial Co., Ltd., Kadoma, Japan

[21] Appl. No.: 662,419

[22] Filed: Jun. 10, 1996

[51] Int. Cl.$^6$ ............................................. H04N 5/76
[52] U.S. Cl. ........................................ 386/46; 386/131
[58] Field of Search .................................. 386/1, 45–46, 386/125–126, 131, 33, 37, 40, 109, 111, 112, 123–124; 348/441, 446, 448–452, 489, 469, 43; 358/906, 909.1; H04N 5/76

[56] References Cited

FOREIGN PATENT DOCUMENTS 7336635  12/1995  Japan .

*Primary Examiner*—Andrew Faile
*Assistant Examiner*—Vincent F. Boccio
*Attorney, Agent, or Firm*—Renner, Otto, Boisselle & Sklar, P.L.L.

[57] ABSTRACT

A progressive scan signal recording apparatus for receiving and recording data representing a frame of a progressive scan TV signal on a magnetic medium includes a combining device for combining data representing a plurality of successive frames to form combination image data; and a recording unit for forming coded data by processing the combination image data with high efficiency coding and recording the coded data on the magnetic medium.

6 Claims, 9 Drawing Sheets

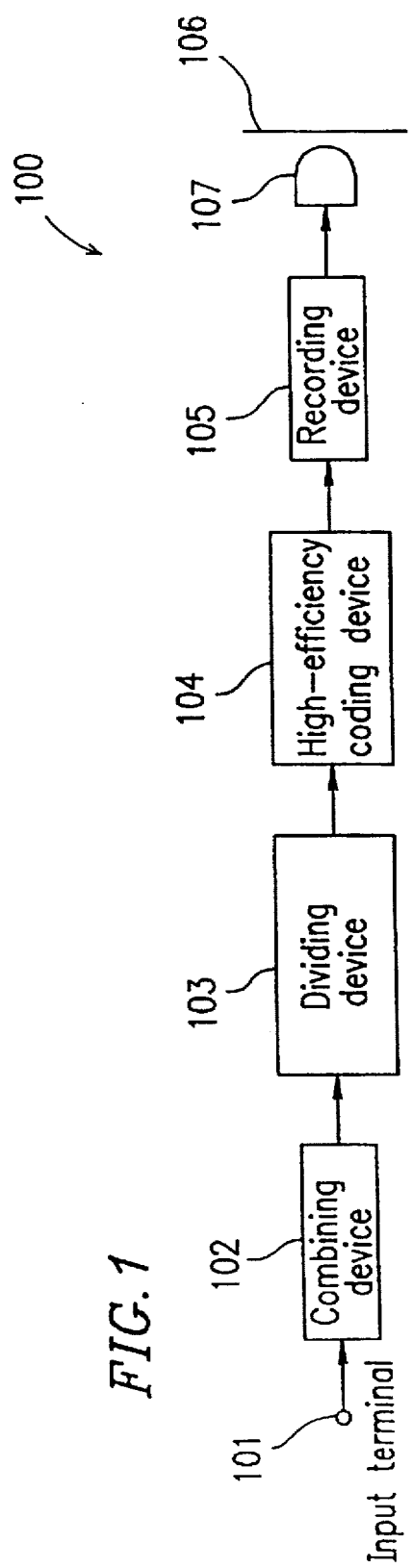

1/60 second

PROGRESSIVE SCAN SIGNAL RECORDING APPARATUS

BACKGROUND OF THE INVENTION

1. Field of the Invention

The present invention relates to a progressive scan signal recording apparatus for performing high efficiency coding of a progressive scan TV signal and recording the resultant signal on a magnetic recording medium.

2. Description of the Related Art

Many methods for receiving, compressing and recording a digitized interlaced scan TV signal on a magnetic medium have been developed. In some of such methods, two successive fields (i.e., two signals adjacent to each other in the time axis) of an interlaced scan TV signal are combined line by line to form a frame, and the frame is recorded on a magnetic medium. Such a method is described in, for example, the U.S. patent application Ser. No. 08/490,326 filed on Jun. 14, 1995 (corresponding Japanese Patent Application: No. 6-316607 filed on Dec. 20, 1994).

Such conventional methods have the following problems: As is described above, one frame formed of two fields is processed as one unit. Thus, in the case of a still image with little or no movement, inter-frame correlation is excessively low to be utilized. As a result, the coding efficiency cannot be sufficiently improved.

SUMMARY OF THE INVENTION

A progressive scan signal recording apparatus, according to the present invention, for receiving and recording data representing a frame of a progressive scan TV signal on a magnetic medium includes a combining device for combining data representing a plurality of successive frames to form combination image data; and a recording unit for forming coded data by processing the combination image data with high efficiency coding and recording the coded data on the magnetic medium.

In another aspect of the invention, a progressive scan signal recording apparatus for receiving and recording input image data representing a frame of a progressive scan TV signal on a magnetic medium includes a switching device for generating first image data and second image data from the input image data; a first coding device for processing the first image data with high efficiency coding to form first coded image data; a second coding device for processing the second image data with high efficiency coding to form second coded image data; and a recording unit for dividing the first coded image data and the second coded image data and recording the divided image data on the magnetic medium simultaneously.

In still another aspect of the invention, a progressive scan signal recording apparatus for receiving and recording input image data representing a frame of a progressive scan TV signal on a magnetic medium includes a color difference signal forming device for generating data representing a color difference signal of the input image data and adding the generated data to the input image data to form extended data; a signal dividing device for generating first image data and second image data from the extended data; a first coding device for processing the first image data to form first coded image data; a second coding device for processing the second image data to form second coded image data; and a recording unit for recording the first coded image data and the second coded image data on the magnetic medium.

Thus, the invention described herein makes possible the advantages of (1) improving the efficiency of high efficiency coding of a progressive scan TV signal, (2) improving the quality of images obtained by trick play, and (3) recording a progressive scan TV signal at a higher rate.

These and other advantages of the present invention will become apparent to those skilled in the art upon reading and understanding the following detailed description with reference to the accompanying figures.

BRIEF DESCRIPTION OF THE DRAWINGS

FIG. 1 is a block diagram of a progressive scan signal recording apparatus in a first example according to the present invention;

DESCRIPTION OF THE PREFERRED EMBODIMENTS

Figure 2A:
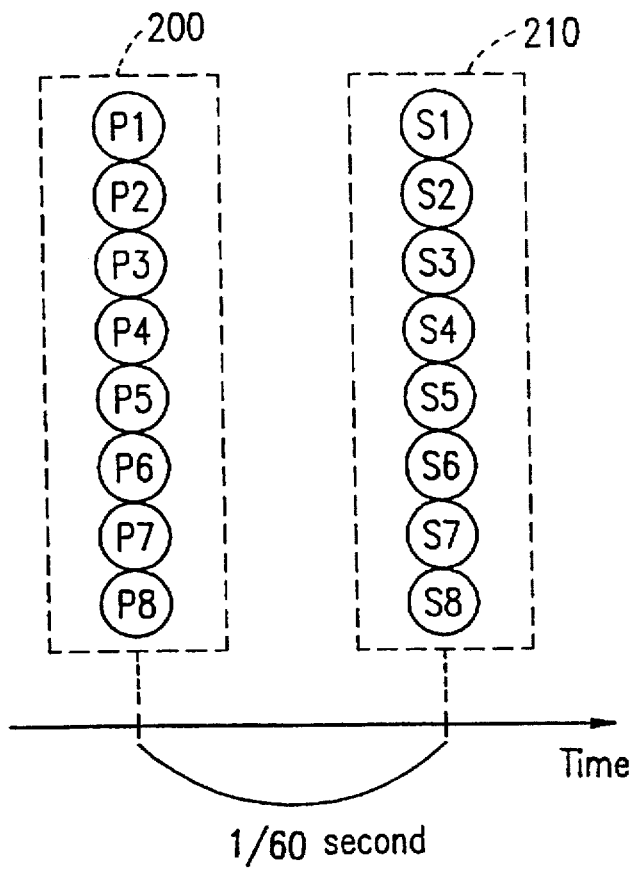
FIGS. 2A and 2B are views illustrating an exemplary method of data combination.

Hereinafter, the present invention will be described by way of illustrative examples with reference to the accompanying drawings.

Example 1

FIG. 1 is a block diagram of a progressive scan signal recording apparatus 100 in a first example according to the present invention.

The progressive scan signal recording apparatus 100 includes an input terminal 101 for receiving a progressive scan TV signal. One exemplary source of a progressive scan TV signal is a progressive camera which has been recently developed for broadcasting. A progressive camera is conforming to the EDTV-2 system which has been developed for realizing an aspect ratio of 16:9 and for improving image quality while being compatible with conventional ground wave broadcasting system (aspect ratio: 4:3). A progressive scan signal generated by the progressive camera is satisfactorily suitable to computers and communication equipment, and thus is a subject of intense interest as a signal for the multi-media era.

The progressive scan signal recording apparatus 100 further includes a combining device 102 for combining two frames of the input progressive scan TV signal to form combination image data (data stream), each frame having 480 scanning lines in an active area thereof; and a dividing device 103 for dividing the combination image data into a prescribed number of coding units. A coding unit is, for example, a block of 8 vertical pixels×8 horizontal pixels. The progressive scan signal recording apparatus 100 further includes a high-efficiency coding device 104 for performing high efficiency coding of each coding unit sent from the dividing device 103 to form coded image data; and a recording device 105 for converting the coded image data into a recording signal and recording the recording signal on a magnetic tape 106 via a magnetic head 107. In this example, the recording signal is compressed to a rate which is equal to the rate at which a HDTV signal is recorded. In this and the following examples, the part of the progressive scan signal recording apparatus from the dividing device to the magnetic heads from a recording unit.

The progressive scan signal recording apparatus 100 operates in the following manner.

Figure 2B:
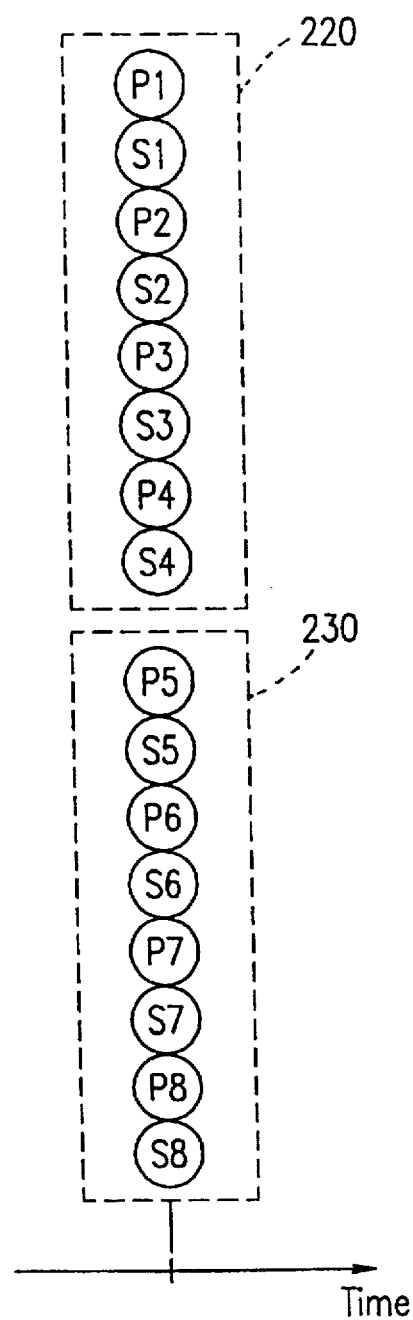

A digital progressive scan TV signal input through the input terminal 101 is converted into combination image data by the combining device 102. FIGS. 2A and 2B illustrate an exemplary method of combination. As is shown in FIG. 2A, the combining device 102 receives data representing two successive frames, namely, a preceding frame and a succeeding frame. A partial area 200 of the preceding frame includes lines P1 through P8, and a partial area 210 of the succeeding frame includes lines S1 through S8. The preceding frame and the succeeding frame are 1/60 second apart. Line P1 and line S1 are on the same location on the screen; and in the same manner, lines P2 through P8 and lines S2 through S8 are respectively on the same location on the screen. By a conventional technology, high efficiency coding is performed using the partial area 200 including lines P1 through P8 as one coding unit and the partial area 210 including lines S1 through S8 as another coding unit.

The combining device 102 combines the input data line by line; i.e., combines lines P1 through P8 and lines S1 through S8 alternately, thereby forming combination image data shown in FIG. 2B. A partial area 220 includes lines P1 through P4 and S1 through S4, and a partial area 230 includes lines P5 through P8 and S5 through S8. High efficiency coding is performed using the partial area 220 as one coding unit and the partial area 230 as another coding unit. In FIG. 2B, the data is represented only in one dimension; i.e., only lines are considered and the pixels in the horizontal direction are ignored. However, those skilled in the art, referring to FIGS. 2A and 2B, would easily appreciate that the above-described combination can be applied to actual frame data which is extended two-dimensionally.

The combination image data obtained in this manner is divided into a prescribed number of coding units by the dividing device 103. The high-efficiency coding device 104 performs high efficiency coding of each coding unit in the same manner as an interlaced scan high definition TV (HDTV) signal. In detail, the combination image data shown in FIG. 2B is regarded as data representing a one-frame image and processed so as to have an equal code amount to that of one frame of an interlaced scan EDTV signal.

The data coded in this manner is recorded on the magnetic tape 106 by the recording device 105 via the magnetic head 107. The number of tracks in which the data is recorded is equal to the number of tracks in which one frame of an interlaced scan HDTV signal is recorded.

As is described above, the progressive scan signal recording apparatus 100 in the first example combines two frames of a progressive scan TV signal. Accordingly, an on-screen area of a DCT (discrete cosine transform) block in the frame generated by the combination, namely, the total of the partial areas 220 and 230 on the screen is smaller than the total of the partial areas 200 and 210 on the screen. In the case where the movement between the two frames is relatively slow before the combination, the correlation between pixels in the DCT blocks is stronger than in the DCT blocks in the frame shown in FIG. 2A. As a result, the coding efficiency is enhanced.

In the case where the movement between the two frames is relatively drastic before the combination, the coding efficiency tends to be reduced. However, human eyes do not recognize deterioration of image quality in a sequence having a drastic movement as easily as in a sequence having a slow movement. Accordingly, slight deterioration in image quality in the case where the movement between the two frames is relatively drastic is negligible.

As the dividing device 103, the high-efficiency coding device 104, and the recording device 105, circuits designed for recording an interlaced scan HDTV signal may be used. As the combining device 102, a circuit designed for framing an interlaced scan HDTV signal may be used. Such a circuit can be easily used by altering the control method of inputting and outputting data to and from the memory. As an input signal, a 4:2:0p signal or 4:2:2p signal defined by BTA's T-1004 standards may be used.

Example 2

Figure 3:
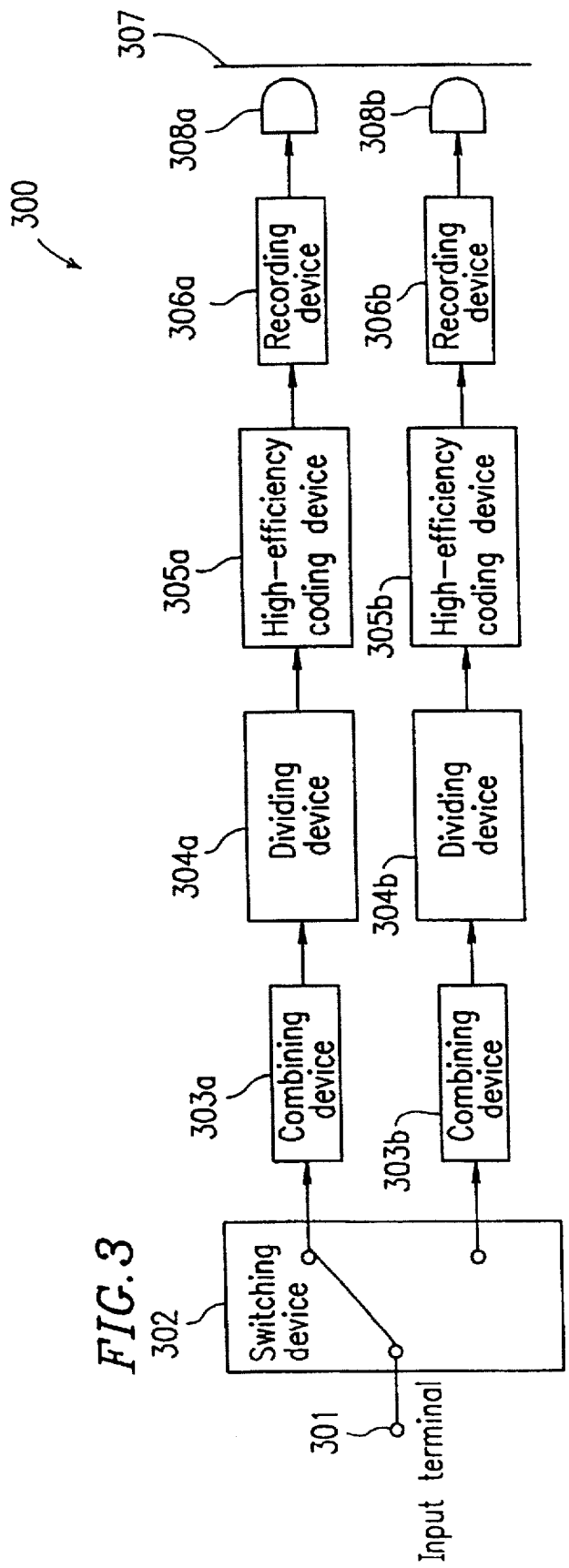
FIG. 3 is a block diagram of a progressive scan signal recording apparatus in a second example according to the present invention.

FIG. 3 is a block diagram of a progressive scan signal recording apparatus 300 in a second example according to the present invention.

The progressive scan signal recording apparatus 300 includes an input terminal 301 to which a progressive scan TV signal is input, and a switching device 302 for dividing data representing a frame of the input signal into two each representing half area of the frame and outputting the data divided into two at ½ of the frame cycle as a channel 1 TV signal and a channel 2 TV signal.

The progressive scan signal recording apparatus 300 further includes a combining device 303a for combining data representing lines of two successive frames of the channel 1 TV signal, the lines being located at the same position on the screen, to form channel 1 combination image data; a combining device 303b for combining data representing lines of two successive frames of the channel 2 TV signal, the lines being located at the same position on the screen, to form channel 2 combination image data; and dividing devices 304a and 304b respectively for dividing the channel 1 combination image data and the channel 2 combination image data into a prescribed number of coding units.

The progressive scan signal recording apparatus 300 further includes high-efficiency coding devices 305a and 305b respectively for performing high efficiency coding of each coding unit sent from the dividing device 304a and each coding unit sent from the dividing device 304b to form channel 1 coded image data and channel 2 coded image data; and a recording device 306a for converting the channel 1 coded image data into a recording signal and recording the recording signal on one of two tracks of a magnetic tape 307 via a magnetic head 308a; and a recording device 306b for converting the channel 2 coded image data into a recording signal and recording the recording signal on the other track of the magnetic tape 307 via a magnetic head 308b.

The progressive scan signal recording apparatus 300 operates in the following manner.

A digital progressive scan TV signal is input to the input terminal 301. Data representing a frame of the input signal is divided into two each representing half area of the frame and output to the combining devices 303a and 303b respectively at, for example, ½ of the frame cycle as a channel 1

TV signal and a channel 2 TV signal. The channel 1 TV signal from a first frame ("n"th frame) and the channel 1 TV signal from a second frame ("n+1"th frame) are combined to form channel 1 combination image data by the combining device 303a. The channel 2 TV signal from the first frame ("n"th frame) and the channel 2 TV signal from the second frame ("n+1"th frame) are combined to form channel 2 combination image data by the combining device 303b. The channel 1 and channel 2 combination image data are respectively divided into a prescribed number of coding units by the dividing devices 304a and 304b. The coding units are processed with high efficiency coding by the high-efficiency coding devices 305a and 395b in the same manner as an interlaced scan standard TV signal, thereby forming channel 1 coded image data and channel 2 coded image data. In detail, each coding unit is processed so as to have an equal code amount to that of one frame of an interlaced scan standard TV signal. Then, the channel 1 coded image data is recorded on the magnetic tape 307 by the recording device 306a via the magnetic head 308a, and the channel 2 coded image data is recorded on the magnetic tape 307 by the recording device 306b via the magnetic head 308b.

As is described above, the progressive scan signal recording apparatus 300 in the second example provides the same effect as that of the first example in two channels by providing a switching device 302 and the combining devices 303a and 303b.

As the dividing devices 304a and 304b, the high-efficiency coding devices 305a and 305b, and the recording devices 306a and 306b, circuits designed for recording an interlaced scan standard TV signal may be used. As the combining devices 303a and 303b, circuits designed for framing an interlaced scan standard TV signal may be used.

The data is switched at ½ of the frame cycle in the second example, but can be switched at another cycle (for example, 1/integer of the frame cycle), in which case shuffling on the screen can be performed at a higher degree and image quality is further improved.

The progressive scan signal recording apparatus 300 has two channels for signal processing, but the number of the channels may be increased in proportion to the number of signals to which the input signal is divided.

As an input signal, the above-mentioned 4:2:0p or 4:2:2p signal may be used.

Example 3

Figure 4:
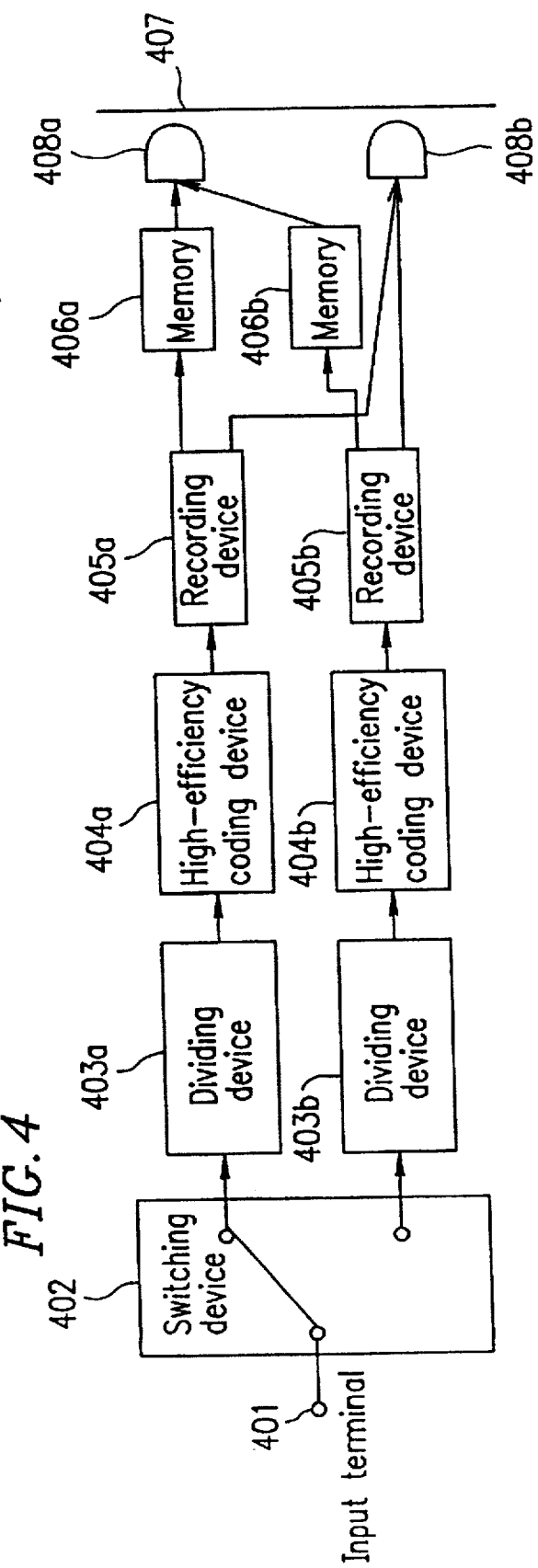
FIG. 4 is a block diagram of a progressive scan signal recording apparatus by a third example according to the present invention.

FIG. 4 is a block diagram of a progressive scan signal recording apparatus 400 in a third example according to the present invention.

The progressive scan signal recording apparatus 400 includes an input terminal 401 to which a progressive scan TV signal is input, and a switching device 402 for sending data representing a frame of the input signal and data representing the next frame of the input signal to two different channels alternatively at the frame cycle as a channel 1 TV signal and a channel 2 TV signal.

The progressive scan signal recording apparatus 400 further includes dividing devices 403a and 403b respectively for dividing the channel 1 TV signal and the channel 2 TV signal into a prescribed number of coding units; and high-efficiency coding devices 404a and 404b respectively for performing high efficiency coding of each coding unit sent from the dividing device 403a and each coding unit sent from the dividing device 403b to form channel 1 coded image data and channel 2 coded image data.

The progressive scan signal recording apparatus 400 further includes a recording device 405a for sending a part of channel 1 coded image data to a memory 406a and sending the rest of the channel 1 coded image data to a magnetic head 408b in channel 2; and a recording device 405b for sending a part of channel 2 coded image data to a memory 406b and sending the rest of the channel 2 coded image data to the magnetic head 408b in channel 2. The memories 406a and 406b are provided for storing the coded image data temporarily so that the data is sent to a magnetic head 408a in channel 1 with delay of ½ of the frame cycle.

The progressive scan signal recording apparatus 400 operates in the following manner.

A digital progressive scan TV signal is input to the input terminal 401. By the switching device 402, data representing a frame of the input signal and data representing the next frame of the input signal are sent to the dividing devices 403a and 403b as a channel 1 TV signal and a channel 2 TV signal alternately at the frame cycle. In other words, the dividing devices 403a and 403b each receive data representing one frame of the input signal every other frame cycle.

The channel 1 TV signal and the channel 2 TV signal are respectively extended to twice as long in the time axis and divided into a prescribed number of coding units by the dividing devices 403a and 493b. The coding units are processed with high efficiency coding by the high-efficiency coding devices 404a and 404b in the same manner as an interlaced scan standard TV signal, thereby forming channel 1 coded image data and channel 2 coded image data. In detail, each coding unit is processed to as to have an equal code amount to that of one frame of an interlaced scan standard TV signal. Then, the channel 1 coded image data and the channel 2 coded image data are respectively rearranged and output. The rearrangement is performed as follows: The recording device 405a outputs a first half of the channel 1 coded image data, namely, data corresponding to ½ of the frame to the memory 406a for temporary storage and outputs a second half of the channel 1 coded image data to the magnetic head 408b without being temporarily stored. The recording device 405b outputs a first half of the channel 2 coded image data, namely, data corresponding to ½ of the frame to the memory 406b for temporary storage and outputs a second half of the channel 2 coded image data to the magnetic head 408b.

Thus, the second half of the one-frame data is recorded in one of two tracks of the magnetic tape 407 via the magnetic head 408b with no delay, and the first half of the one-frame data is recorded in the other track of the magnetic tape 407 via the magnetic head 408a with delay of ½ of the frame cycle. Accordingly, the first half and the second half of the one-frame data are both recorded in the respective tracks of the magnetic tape 407 simultaneously.

Figure 5A:
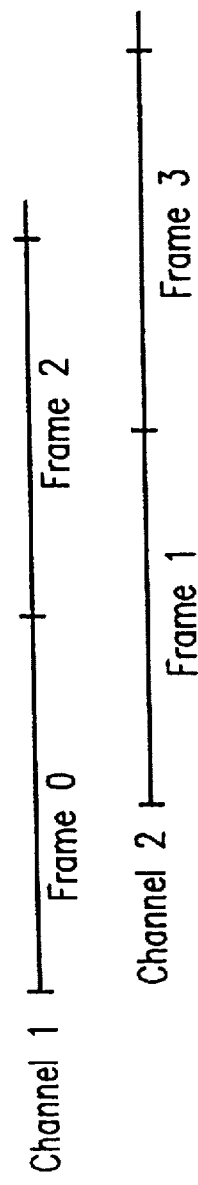
FIGS. 5A, 5B, 6A and 6B are views for explaining data rearrangement performed by the progressive scan signal recording apparatus in the third example.
Figure 5B:
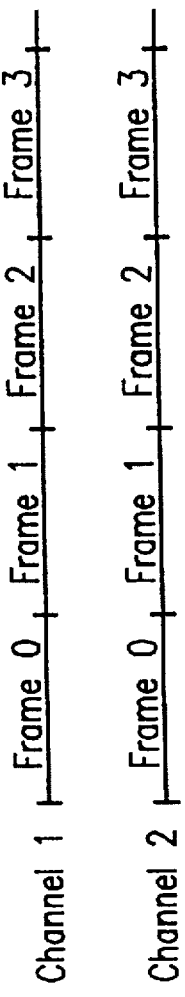

FIGS. 5A and 5B are views for explaining the above-described rearrangement. FIG. 5A shows the frames which are written in the two tracks of the magnetic tape 407 if the recording devices are respectively connected directly to the magnetic heads. In such a structure, data representing each frame is recorded using only the channel, and data which are recorded on the magnetic tape 407 simultaneously represent different frames.

FIG. 5B shows the frames which are written in the two tracks of the magnetic tape 407 in the progressive scan signal recording apparatus 400 in the third example. As is shown here, data representing the same frame are recorded on the magnetic tape 407 simultaneously. The timing of recording is improved in this manner.

As is described above, the progressive scan signal recording apparatus 400 in the third example partially stores the data from the recording devices 405a and 405b in the memories 406a and 406b temporarily. Thus, data representing the same frame can be recorded on the magnetic tape 407 simultaneously. Such a function is especially useful for performing trick play. Even when the scanning rate of the magnetic heads 408a and 408b with respect to the magnetic tape 407 is changed for performing trick play, the data representing the same frame are reproduced simultaneously. Accordingly, the reproducing rate of the image data of a particular frame is enhanced. As a result, the image quality in the trick play mode can be improved significantly. This will be described in detail with reference to FIGS. 6A and 6B.

Figure 6A:
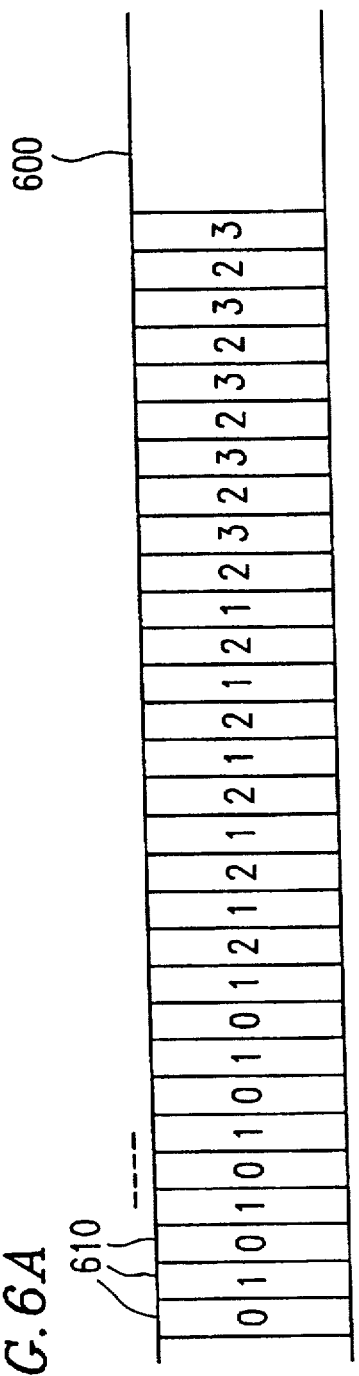
Figure 6B:
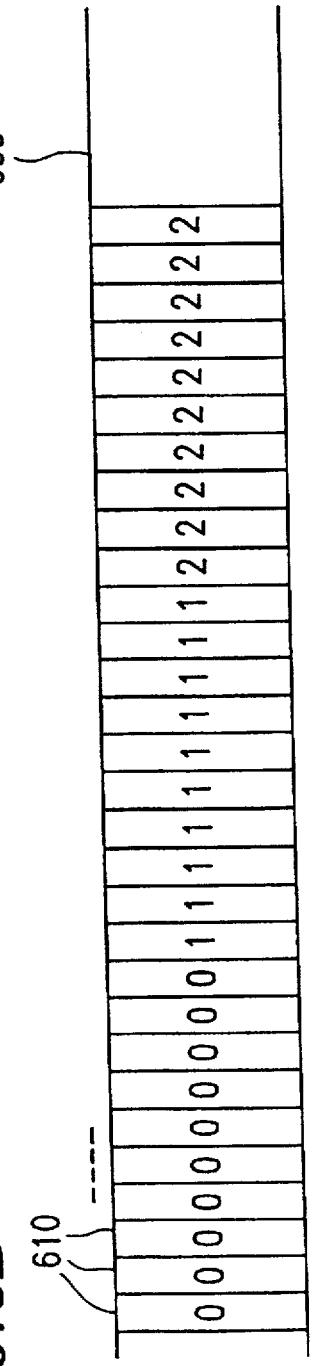

FIG. 6A shows the frames which are recorded in tracks 610 of a magnetic tape 600 (corresponding to the magnetic tape 407) if the recording devices are directly connected to the magnetic heads. FIG. 6B shows the frames which are recorded in the tracks 610 when the data from the recording devices 405a and 405b are partially delayed by temporary storage in the memories 406a and 406b as in the third example. As is easily appreciated, FIGS. 6A and 6B respectively correspond to FIGS. 5A and 5B. In the case of FIG. 6B, the data representing the same frame are recorded on the magnetic tape 600 simultaneously.

The memories 406a and 406b are provided after the recording devices 405a and 405b in the third example, but may be provided at any other location as long as the two memories 406a and 406b are at the same location in the two channels. For example, the memories 406a and 406b may be provided immediately after the high-efficiency coding devices 404a and 404b or in the recording devices 405a and 405b.

As an input signal, the 4:2:0p or 4:2:2p signal may be used.

Example 4

Figure 7:
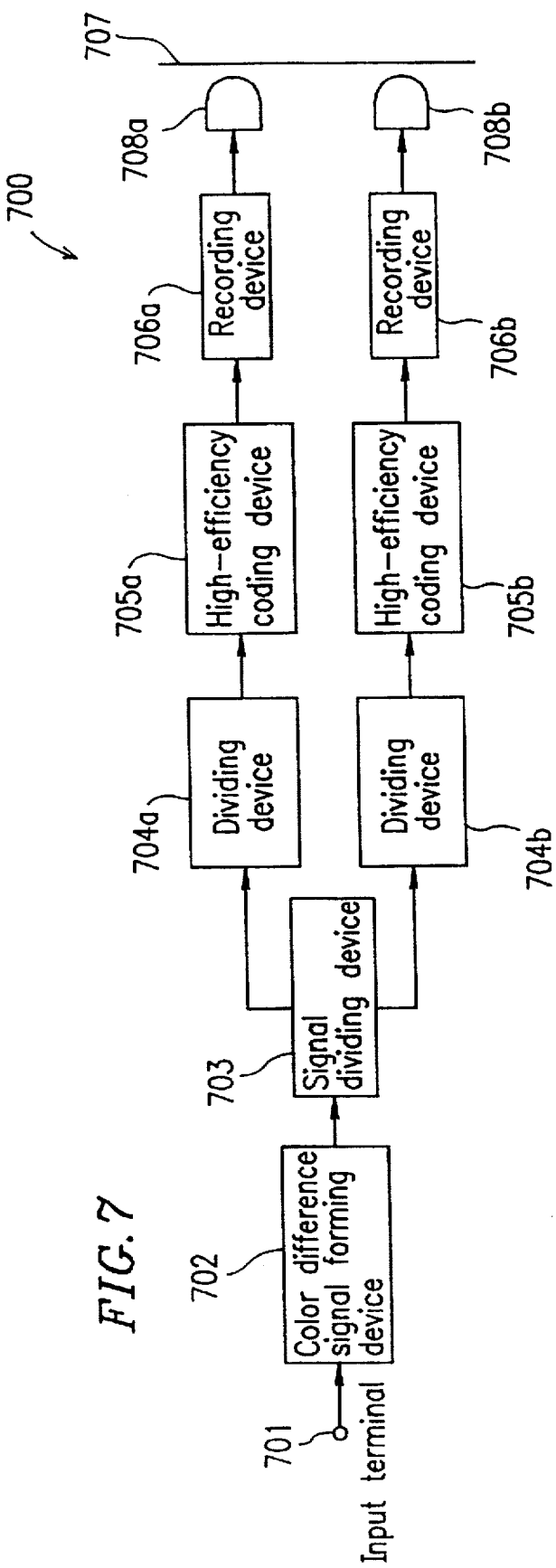
FIG. 7 is a block diagram of a progressive scan signal recording apparatus in a fourth example according to the present invention.

FIG. 7 is a block diagram of a progressive scan signal recording apparatus 700 in a fourth example according to the present invention.

The progressive scan signal recording apparatus 700 includes an input terminal 701 to which a progressive scan TV signal is input. As a progressive scan TV signal, the 4:2:0p signal is input. The progressive scan signal recording apparatus further includes a color difference signal forming device 702 for obtaining a color difference signal by interpolation. In detail, the color difference signal forming device 702 forms a color difference signal of the auxiliary signal by, for example, copying a color difference signal of the 4:2:0p signal.

The progressive scan signal recording apparatus 700 further includes a signal dividing device 703 for dividing the input signal into a channel 1 TV signal and a channel 2 TV signal; dividing devices 704a and 704b respectively for dividing the channel 1 TV signal and the channel 2 TV signal into a prescribed number of coding units; high-efficiency coding devices 705a and 705b respectively for performing high efficiency coding of each coding unit sent from the dividing devices 704a and 704b to form channel 1 coded image data and channel 2 coded image data; and recording devices 706a and 706b respectively for converting the channel 1 coded image data and the channel 2 coded image data into recording signals and recording the recording signals on a magnetic tape 707 via magnetic heads 708a and 708b.

The progressive scan signal recording apparatus 700 operates in the following manner.

A 4:2:0p signal is input to the input terminal 701. The color difference forming device 702 receives the 4:2:0p signal, generates a 4:2:2p signal from the 4:2:0p signal, and outputs the 4:2:2p signal to the signal dividing device 703. The 4:2:0p signal and the 4:2:2p signal are both defined by the T-1004 standards of BTA. The color difference forming device 702 generates the 4:2:2p signal by copying a color difference signal of the 4:2:0p signal. By such processing, the input 4:2:0p signal is converted into a signal including two 4:2:2 signals.

Figure 8:
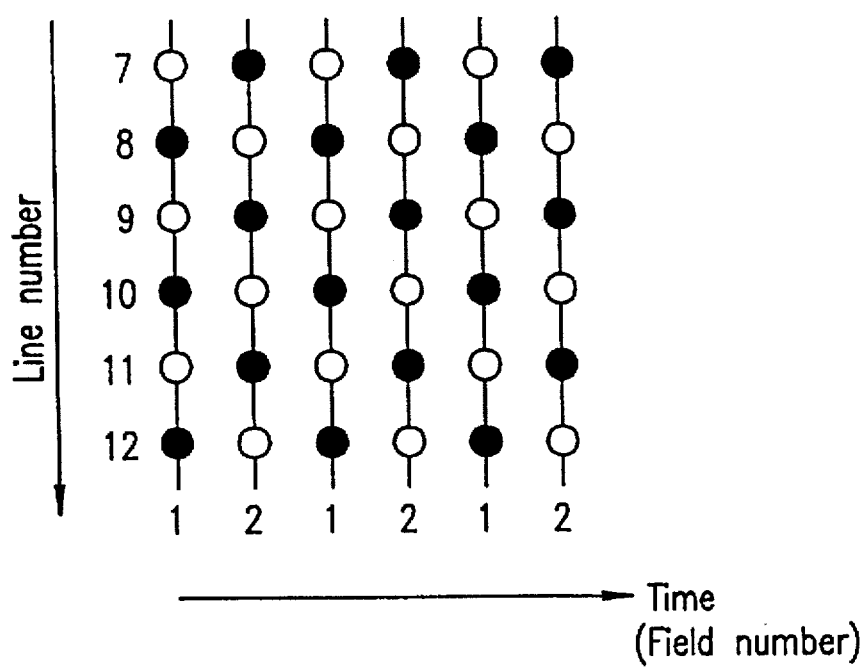
FIG. 8 is a view for explaining a 4:2:0p signal.

The operation of the color difference signal forming device 702 will be described with reference to FIG. 8. In FIG. 8, the horizontal line represents time (i.e., field number), and the vertical line represents the line number. FIG. 8 illustrates a 4:2:0p signal. White dots have Y:Cr:Cb information, and block dots have Y' information.

Provided FIG. 8 represents a 4:2:2p signal which is generated from the 4:2:0p signal, the white dots have Y:Cr:Cb information, and the block dots have Y':Cr':Cb' information. Y and Y' each represent a luminance signal, and Cr, CR', Cb and Cb' each represent a color difference signal.

Accordingly, in order to generate the 4:2:2p signal from the 4:2:0p signal, Cr and Cb can be used as Cr' and Cb'.

The signal dividing device 703 divides the 4:2:2p signal obtained in this manner into, for example, two 4:2:2 signals and output the two 4:2:2 signals to the dividing devices 704a and 704b respectively. The signal dividing device 703 may output data representing the black dots and data representing the white dots to the dividing devices 704a and 704b, respectively.

The signal which is sent to the dividing device 704a is divided into a prescribed number of coding units and processed by the high-efficiency coding device 705a so as to have an equal code amount to that of one frame of an interlaced scan HDTV signal. The signal which is sent to the dividing device 704b is divided into a prescribed number of coding units and processed by the high-efficiency coding device 705b so as to have an equal code amount to that of one frame of an interlaced scan HDTV signal. The coded image data obtained in this manner are respectively recorded on the magnetic tape 707 by the recording devices 706a and 706b via the magnetic heads 708a and 708b in the same manner as one frame of an interlaced scan HDTV signal.

As is described above, the progressive scan signal recording apparatus 700 in the fourth example forms a color difference signal of the auxiliary signal by the color difference signal forming device 702 and divides the resultant signal into two by the signal dividing device 703. Due to such a structure, the input 4:2:2:4 signal can be recorded on the magnetic tape 707 at a sufficiently high rate using a conventional apparatus designed for recording an interlaced scan TV signal.

Furthermore, the provision of the device for obtain a color difference signal increases the number of effective pixels of the color difference signal. Accordingly, even when the input signal is to be divided into a plurality of signals for improving the data rate at which the signal is recorded, a conventional IC designed for processing an interlaced scan signal can be used.

The method for forming a color difference signal using the color difference signal forming device 702 is arbitrary, and the method for dividing the signal using the signal dividing device 703 is also arbitrary. In the case where a progressive scan "4:2:2p signal" defined by BTA's T-1004 standards is input, the color difference signal forming device 702 can be eliminated.

Example 5

Figure 9:
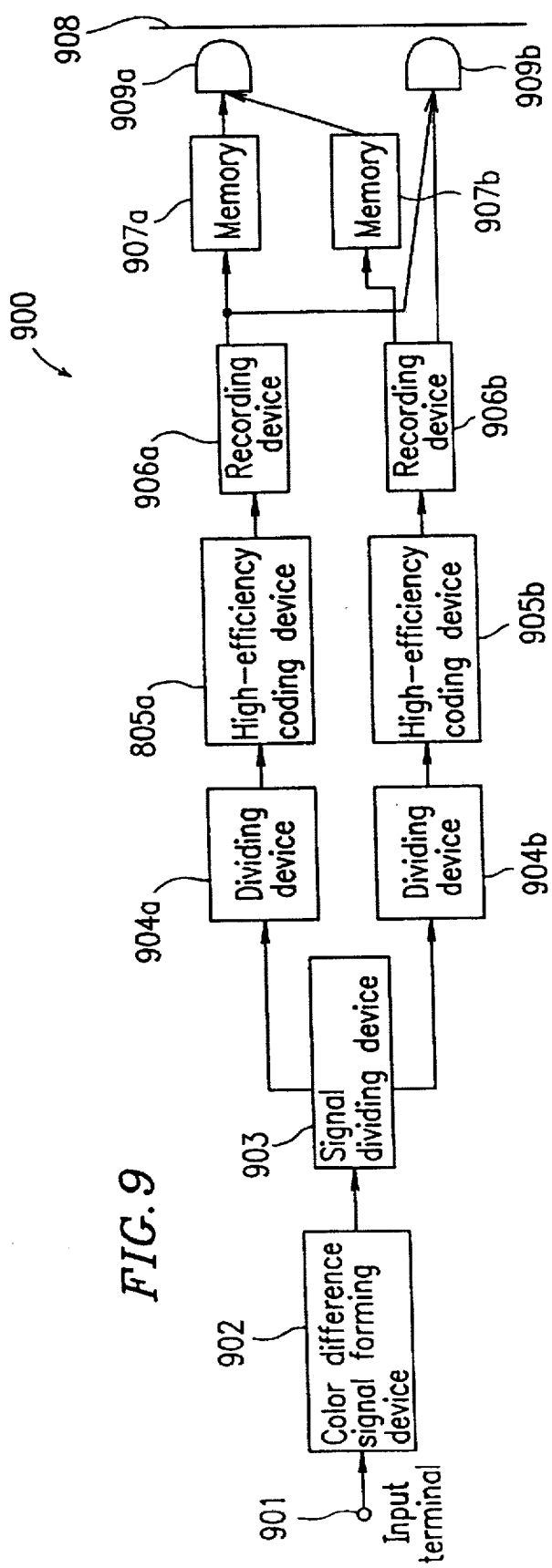
FIG. 9 is a block diagram of a progressive scan signal recording apparatus in a fifth example according to the present invention.

FIG. 9 is a block diagram of a progressive scan signal recording apparatus 900 in a fifth example according to the present invention.

The progressive scan signal recording apparatus 900 includes an input terminal 901 to which the 4:2:0p signal is input as a progressive scan TV signal; a color difference signal forming device 902 for obtaining a color difference signal by interpolation; a signal dividing device 903 for dividing the color difference signal obtained by the interpolation into, for example, two; dividing devices 904a and 904b respectively for dividing the signals into a plurality of coding units; high-efficiency coding devices 905a and 905b respectively for performing high efficiency coding of each coding unit to form coded image data, recording devices 906a and 906b respectively for converting the coded image data into recording signals, as in the fourth example.

The progressive scan signal recording apparatus 900 further includes memories 907a and 907b for temporarily storing the recording signals to send a part of each recording signal with delay of ½ of the frame cycle as in the third example.

The progressive scan signal recording apparatus 900 operates in the following manner.

A 4:2:0p signal which is input through the input terminal 901 is processed by the color difference signal forming device 902, the signal dividing device 903, the dividing devices 904a and 904b, and the high-efficiency coding devices 905a and 905b, and then sent to the recording devices 906a and 906b in the same manner as in the fourth example.

The recording devices 906a and 906b act in the same manner as the recording devices 405a and 405b in the third example. In detail, a first half of the data representing one frame which is input to the recording device 906a is sent to the memory 907a, and a second half of such data is sent to a magnetic head 909b in channel 2. When the second half of the one-frame data is sent to the magnetic head 909b, the first half of the data which has been stored in the memory 907a is sent to a magnetic head 909a simultaneously. A first half of the data representing one frame which is input to the recording device 906b is sent to the memory 907b, and a second half of such data is sent to the magnetic head 909b in channel 2. When the second half of the one-frame data is sent to the magnetic head 909b, the first half of the data which has been stored in the memory 907a is sent to the magnetic head 909a simultaneously. Since the data stored in the memories 907a and 907b are delayed by ½ of the frame cycle, the data representing the same frame can be recorded on the magnetic tape 908 simultaneously.

The progressive scan signal recording apparatus 900 in the fifth example includes the memories 907a and 907b added to the structure in the fourth example. Due to such a structure, the data representing one frame is divided into two, and such divided data can be output in two channels simultaneously. Accordingly, even when the image data is recorded on the magnetic tape 908 at a sufficiently high rate for trick play or the like, the image quality can be improved.

The method for forming a color difference signal using the color difference signal forming device 902 is arbitrary, and the method for dividing the signal using the signal dividing device 903 is also arbitrary. In the case where a progressive scan "4:2:2p signal" is input, the color difference signal forming device 902 can be eliminated. The memories 907a and 907b are provided after the recording devices 906a and 906b in the fifth example but may be provided at any location as long as the two memories 907a and 907b are located at the same position in the two channels. For example, the memories 907a and 907b may be provided after the high-efficiency coding devices 905a and 905b or in the recording devices 906a and 906b.

As has been described so far, according to the present invention, two successive frames of an input progressive scan TV signal are combined to form combination image data. Accordingly, a conventional circuit designed for recording an interlaced scan TV signal can be used for recording a progressive scan TV signal.

Furthermore, the correlation between two successive frames of the input signal is sufficiently high to improve the coding efficiency. Accordingly, a practical effect that a video image obtained by a progressive camera can be recorded on a conventional digital VTR is obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A progressive scan signal recording apparatus for receiving and recording data representing a frame of a progressive scan TV signal on a magnetic medium, comprising:

a combining device for combining data representing a first portion of a preceding frame and a second portion of a succeeding frame to form combination image data; and a recording unit for forming coded data by processing the combination image data with high efficiency coding and recording the coded data on the magnetic medium, wherein the preceding frame and the succeeding frame are successive frames of the progressive scan TV signal, and lines of the first portion correspond to lines of the second portion respectively within the frame of the progressive scan TV signal.

2. A progressive scan signal recording apparatus according to claim 1, wherein the combining device combines the data representing a plurality of frames line by line.

3. A progressive scan signal recording apparatus according to claim 2, wherein the recording unit performs the high efficiency coding so that the combination image data has an equal code amount with a code amount of data representing one frame of an interlaced scan HDTV signal processed with high efficiency coding.

4. A progressive scan signal recording apparatus according to claim 1, further comprising a switching device for dividing the data representing a frame into a plurality of divided data respectively representing a plurality of areas of the frame and outputting the divided data to the combining device.

5. A progressive scan signal recording apparatus according to claim 4, wherein the combining device combines the divided data corresponding to a plurality of frames line by line.

6. A progressive scan signal recording apparatus according to claim 5, wherein the recording unit performs the high efficiency coding so that the combination image data has an equal code amount with a code amount of data representing one frame of an interlaced scan standard-definition TV signal processed with high efficiency coding.

* * * * *

UNITED STATES PATENT AND TRADEMARK OFFICE
CERTIFICATE OF CORRECTION

PATENT NO. : 5,734,782
DATED : March 31, 1998
INVENTOR(S) : Yuji Fujiwara et al

It is certified that error appears in the above-identified patent and that said Letters Patent is hereby corrected as shown below:

On the title page, insert items [30] and [56] as follows:

--[30]  Foreign Application Priority Data

June 12, 1995    [JP]    Japan    7-170260

[56]    References Cited

U.S. Patent Documents

| | | |
|---|---|---|
| 5,563,661 | 10/08/96 | Takahashi et al. |
| 5,555,097 | 09/10/96 | Joung et al. |
| 5,530,484 | 06/25/96 | Bhatt et al. |
| 5,335,013 | 08/02/94 | Faber |
| 5,280,397 | 01/18/94 | Rhodes |
| 4,974,064 | 11/27/90 | Tsinberg -- |

Signed and Sealed this

Fourth Day of May, 1999

*Attest:*

*Attesting Officer*

Q. TODD DICKINSON

*Acting Commissioner of Patents and Trademarks*